United States Patent

Kopacin

[11] Patent Number: 5,284,017
[45] Date of Patent: Feb. 8, 1994

[54] HYDRAULIC MASTER CYLINDER
[75] Inventor: Boris Kopacin, Nantere, France
[73] Assignee: Automotive Products, plc, Warwickshire, England
[21] Appl. No.: 910,153
[22] PCT Filed: Jan. 15, 1991
[86] PCT No.: PCT/EP91/00058
 § 371 Date: Jul. 22, 1992
 § 102(e) Date: Jul. 22, 1992
[87] PCT Pub. No.: WO91/11621
 PCT Pub. Date: Aug. 8, 1991
[30] Foreign Application Priority Data
 Jan. 24, 1990 [FR] France ................. 90 00812
[51] Int. Cl.⁵ .......................... F15B 7/00; B60T 11/26
[52] U.S. Cl. .......................................... 60/533; 60/585; 60/592; 91/376 R
[58] Field of Search ............. 60/533, 547.1, 585, 60/586, 587, 588, 589, 592; 91/376 R

[56] References Cited
U.S. PATENT DOCUMENTS

| | | | |
|---|---|---|---|
| 1,963,114 | 6/1934 | Bowen | 60/588 |
| 1,981,653 | 11/1934 | Loweke | 60/588 |
| 3,065,604 | 11/1962 | Radol | 60/588 |
| 4,407,125 | 10/1983 | Parsons | 60/592 X |
| 4,941,323 | 7/1990 | Leigh-Monstevens | 60/589 |

FOREIGN PATENT DOCUMENTS

| | | |
|---|---|---|
| 3246130 | 6/1984 | Fed. Rep. of Germany . |
| 8907541 | 8/1989 | PCT Int'l Appl. . |
| 551017 | 2/1943 | United Kingdom . |
| 1536353 | 12/1978 | United Kingdom . |

Primary Examiner—Edward K. Look
Assistant Examiner—Hoang Nguyen
Attorney, Agent, or Firm—Paul E. Milliken; Lee A. Germain

[57] ABSTRACT

The master cylinder comprises a body 10 formed with a bore 13, a piston 19 slidable in the bore to discharge hydraulic working fluid from the bore and an annular reservoir 17 for communication with the bore 13 and which is concentric with the bore. The reservoir contains a flexible diaphragm 30 which separate fluid in the reservoir 17 from ambient air. The use of the concentric reservoir 17 and diaphragm 30 makes the master cylinder particulary compact and suitable for use in a prefilled clutch release system of a vehicle.

9 Claims, 2 Drawing Sheets

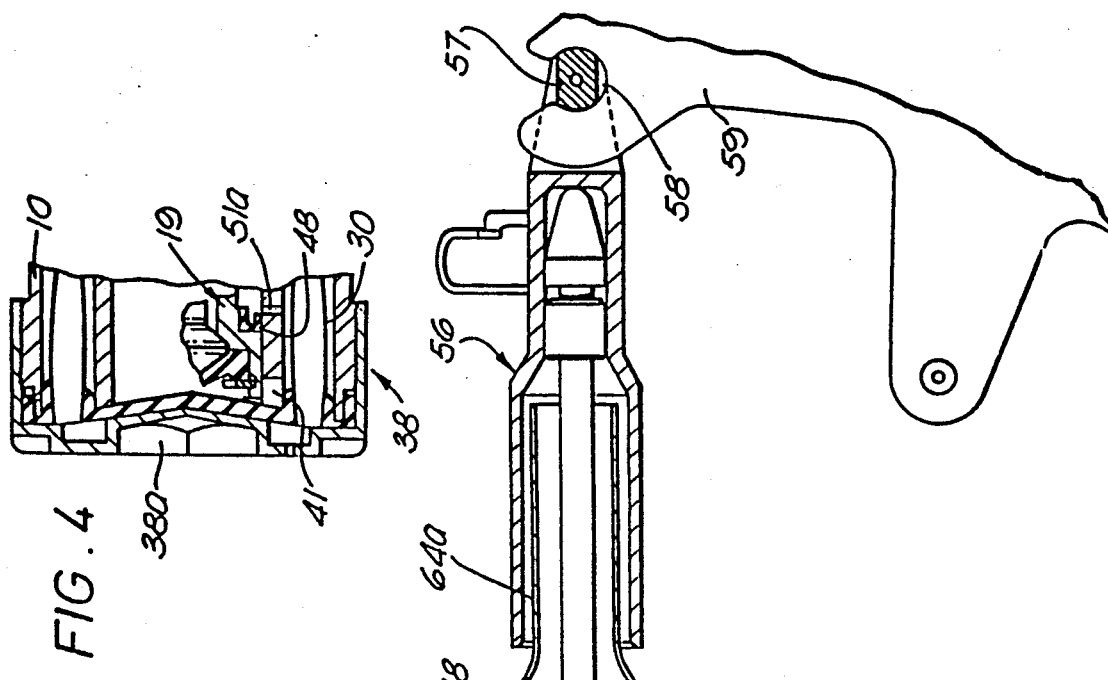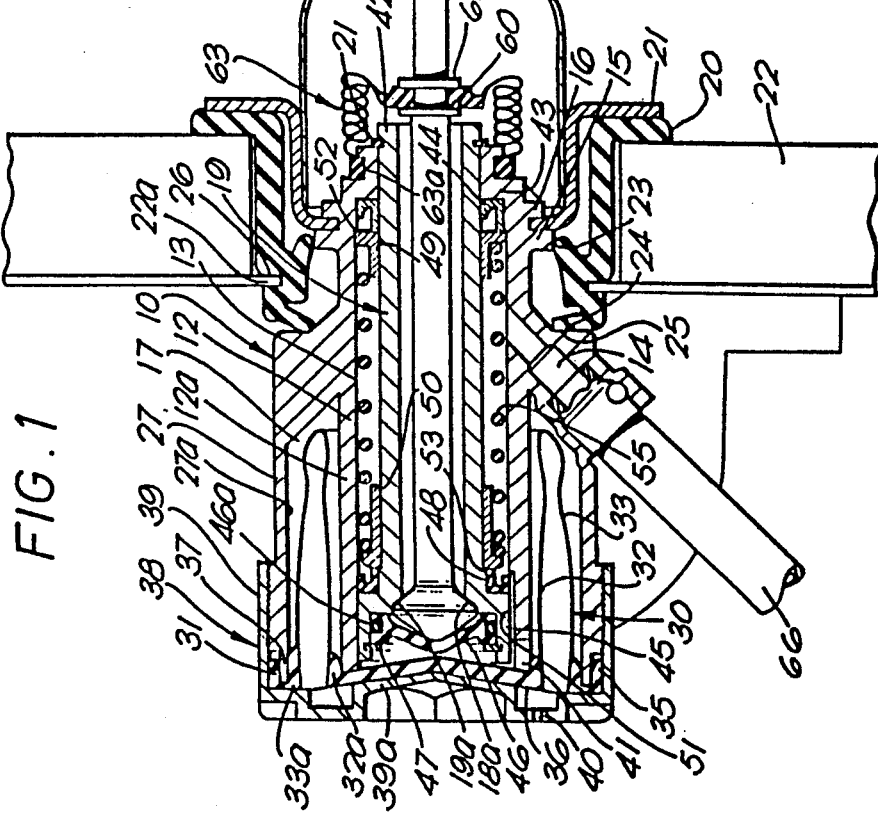

HYDRAULIC MASTER CYLINDER

The invention relates to a hydraulic master cylinder particularly, but not exclusively, for use in a clutch control system of a motor vehicle. In particular the invention is concerned with a master cylinder which includes a reservoir in which a flexible diaphragm is provided which separates fluid in the reservoir from ambient air. Such an arrangement is disclosed in U.S. Pat. No. 4,407,125 where the master cylinder is used in a clutch release system which is filled with hydraulic fluid and bled before being shipped and installed on the motor vehicle. Other master cylinders having reservoirs containing flexible diaphragms are disclosed in U.S. Pat. No. 4,590,765 and U.S. Pat. No. 3,357,181.

It is becoming of increasing importance to reduce the size of components such as hydraulic master cylinders so as to take up the minimum amount of space in the engine compartment of the vehicle. In each of the master cylinders referred to above the reservoir is tubular with its axis projecting radially outwards from the remainder of the cylinder. Whilst there are many instances where such an arrangement is perfectly acceptable, such radially projecting reservoirs can prove difficult to accommodate in certain cases. Documents GB-A-1536353 and DE-A-3246130 illustrated the known use of annular fluid feeding spaces around a master cylinder bore. However such fluid spaces do not constitute fluid reservoirs in that they are themselves connected to fluid reservoirs that project from the master cylinder.

An object of the present invention is to provide a master cylinder including a reservoir which provides improved compactness whilst permitting use in a pre-filled system.

According to the invention there is provided a hydraulic master cylinder comprising a body formed with a bore, a piston slidable in the bore to discharge hydraulic working fluid from the bore, and a reservoir whose fluid chamber is arranged to communicate with the pressure chamber of the bore when the piston is in an 'at-rest' condition, the reservoir containing a flexible diaphragm which separates fluid in the reservoir from ambient air, characterised in that the reservoir extends concentrically around the bore, and the diaphragm projects into the reservoir. The or each locating portion may be a thickened portion of its associated wall.

Preferably the reservoir extends from one end of the body. Such an arrangement facilitates easy manufacture of the body as the reservoir can easily be formed with an open axial end into which the diaphragm can be inserted.

The diaphragm may include a portion extending between the inner wall of the diaphragm and overlying the end of the bore.

Conveniently, the reservoir may be sealingly closed by a cap at one end of the body and, in such a case, the cap may hold a mounting portion of said diaphragm in sealing engagment with a mounting on the body to inhibit leakage of ambient air into the reservoir.

The reservoir may be provided around one end of the bore with an operating rod for the piston extending out of the opposite end of the bore. The piston, in such a case, will preferably be urged along the bore by pulling the operating rod, e.g., by means of a clutch pedal.

Preferably the hollow interior of the piston is sealed from said reservoir by means of a closure element. The operating rod may be retained in the piston by the closure element and a surface of the piston. The said surface of the piston and an interengaging surface of the operating rod may be of complementary shape, e.g., of spherical form. The complementary shape is preferably arranged to permit a certain mount of angular tilting of the operating rod relative to the piston.

A master cylinder in accordance with the invention will now be described by way of example with reference to the accompanying drawings in which:

FIG. 1 is a cross-section through a master cylinder in accordance with the invention for a clutch control system with a piston in a rest position.

FIGS. 4 is a fragmentary portion of the device shown in FIG. 2.

Figures 2, 3:
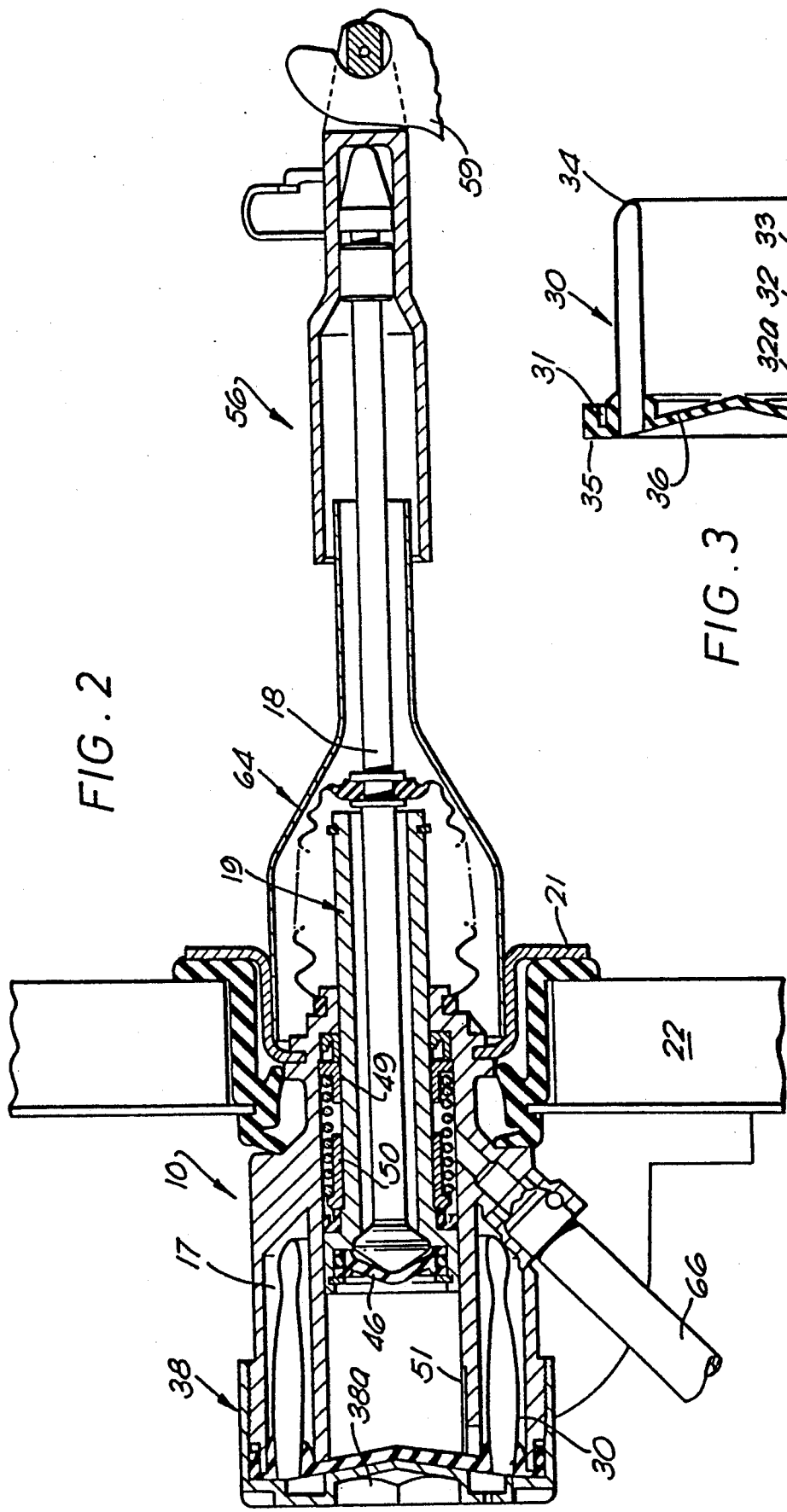
FIG. 2 is a cross section similar to FIG. 1 showing the piston in a working position.
FIG. 3 is a cross-section through a diaphragm for the reservoir of the master cylinder of FIGS. 1 and 2.

The master cylinder has a body 10 formed with part 12 defining a bore 13, an outlet port 14 for fluid, two spaced apart mounting flanges 15, 16, a reservoir 17, an operating rod 18 and a piston 19 slidable in the bore 13. The body is formed as a one piece moulding from plastics material.

The mounting flanges 15, 16 locate a dished mounting element 21 engageable with an annular seal 20. The seal 20 sealingly locates on a bulkhead or firewall 22 of the vehicle and has internal sealing edges 23, 24 which engage the flange 16 and an annular wall 25 of the body 10. The seal 20 is formed with a peripheral groove 26 which locates a lip 22a on the bulkhead 22.

The reservoir 17 is annular and is concentric with the body part 12 defining the bore 13. The reservoir is defined between an outer cylindrical surface 12a of the body part 12 and an inner cylindrical surface 27a of an outer wall 27 spaced from body part 12.

A tubular diaphragm 30 projects into the reservoir and has concentric inner and outer walls 32, 33 which are interconnected at their inner ends by an integral wall 34 and which are integral at their outer ends with a mounting portion 35 and a closure portion 36 respectively. The walls 32, 33 have annular thickened locating section 32a, 33a which fit sealingly against surfaces 27a, 12a, respectively. If desired one only of such walls may have a locating section thereon. The mounting portion 35 is formed with a peripheral groove 31 which locates on a mounting in the form of a cylindrical extension 37 of the wall 27. The closure portion 36 extends across the end of bore 13. The diaphragm 30 is held sealingly in position by a closure cap 38. The cap 38 has a cylindrical side wall 39 which fits, preferably by screwing, on to the outer wall 27. The cap 38 has a dished end surface 39a engaging the closure portion 36 and a socket 38a to enable it to be screwed to the body 10. The cap 38 is formed with a vent 40 to permit ambient air to enter and escape from the interior of the diaphragm between walls 32, 33.

The piston 19 is tubular and includes main section 42 which extends through an annular wall 43 at the right hand end of the body 10 as viewed in the drawings. An annular seal 44 is located against the wall 43 and sealingly engages the main section 42 of the piston. The piston includes a larger diameter inner end section 45 which carries retaining element 46 held in position by an internal snap-ring 47. The retaining element 46a carries a seal 46 which sealingly engages the adjacent interior surface of the piston 19 and seals the interior of piston 19 from hydraulic fluid in the reservoir 17. An annular seal 48 abuts the inner end section 45 and sealingly engages the bore 13. The seals 44, 48 are held axially in position by annular spring abutments 49, 50 respectively. The abutment 49 abuts a shoulder 52 at the right hand end of the bore 13 and the abutment 50 abuts a shoulder 53 on the piston 19. A helical compression spring 55 is held in compression between the abutments 49, 50 and holds the latter against the shoulders 52, 53 thereby retaining the seals 44, 48 in position. The extreme left hand or rest position of the piston 19 is fixed by a snap ring 21 on the piston which engages the right-hand end of the body 10 and the extreme right hand or working position.

A reservoir port 41 is provided in the left-hand end of body part 12 which communicates with an axial groove 51 formed in the bore 13.

The piston 19 has a spherical end surface 19a. The operating rod 18 has a spherical surface 18a thereon which is held slidably in abutment with the end surface 19a by the operating rod retaining element 46. The operating rod 18 projects out of the open right-hand end of the piston 19 and is axially fast with a drive sleeve 56. The drive sleeve 56 has a transverse drive bar 57 which is received in a recess 58 of a clutch pedal lever 59. The operating rod 18 has two peripheral flanges 60, 62 which locate one end of a gaiter 63, the other end of which locates in a groove 63a in the right-hand end of the body 10.

A tubular dust cover 64 is carried by the inside of the mounting element 21 and a reduced diameter portion 64a thereof extends into the drive sleeve 56.

In use the bore 13, reservoir 17, a slave cylinder (not shown) and an interconnecting conduit 66 are initially filled with hydraulic fluid bled of air. The system is supplied pre-filled and pre-bled for installation in the vehicle. The piston 19 is normally held in the position shown in FIG. 1 by the spring 55. In that position, the seal 48 just uncover the right-hand end of groove 51. To actuate the master cylinder, the operating rod 18 is moved towards the right by lever 59, e.g., into the position shown in FIG. 2 thereby causing the piston 19 to move beyond groove 51 and to force working fluid out of the bore 13 and through the outlet port 14 to operate the salve cylinder and disengage a vehicle clutch. The advancing piston also draws fluid from the reservoir 17 into the portion of the bore 13 to the left of the piston.

The provision of interengaging spherical surfaces 18a, 19a permit a certain amount of tilting movement of the operating rod 18 relative to the piston 19. The operating rod 18 is shown slightly tilted in FIGS. 1 and 2.

To re-engage the clutch, the lever 59 is released, hydraulic fluid from the slave cylinder returns to the bore 13 through conduit 66 and the piston 19 returns to the FIG. 1 position causing hydraulic fluid to the left of the piston reaches its rest position, fluid can flow between the reservoir and the portion of the bore 13 to the right of the piston along the groove 51 if necessary. Diaphragm 30 forms a deformable impervious barrier within the reservoir 17 to keep liquid in the system and air out of the system, prevents moisture from entering the liquid and allows for expansion and contraction of the liquid under temperature variations. The diaphragm 30 also allows for variations in atmospheric conditions, and acts as a flexible medium to compensate for liquid flow into and out of the reservoir 17 during actuation of the master cylinder and to compensate for changes in the volume of the liquid in the system due to wear in the system or system leakage. During deformation, the diaphragm walls 32, 33 move towards or away from each other as in FIGS. 1 and 2. The diaphragm enables the master cylinder to be used as part of a pre-filled system comprising a master cylinder, slave cylinder and interconnecting conduit.

The use of the concentric reservoir 17 enables a reservoir of large volume to be provided whilst keeping to a minimum the overall transverse dimension of the master cylinder. Also, by arranging the reservoir concentrically around the bore defining part 12 of the body 10, the overall length of the master cylinder can be kept to a minimum.

I claim:

1. A hydraulic master cylinder comprising a body formed with a bore, a piston slidable in the bore to discharge hydraulic working fluid from a pressure chamber of the bore and a reservoir extending concentrically around the bore to form an annular fluid chamber which is arranged to communicate with the pressure chamber of the bore when the piston is in an 'at-rest' condition, the reservoir containing a flexible diaphragm which seals fluid in the reservoir from ambient air, and which projects axially into the reservoir annular chamber.

2. A hydraulic cylinder according to claim 1 characterised in that reservoir (17) is annular, and the diaphragm (30) is a tube (17) having concentric walls (32, 33) which extend substantially concentrically within reservoir (17) and are interconnected at one end by an integral end wall (34).

3. A hydraulic cylinder according to claim 2 characterised in that the reservoir is defined between cylindrical surfaces at least one of which engages a locating portion provided on at least one of said concentric walls at the end away from the integral wall 34.

4. A hydraulic cylinder according to claim 1, characterised in that the diaphragm includes a portion extending between the inner wall of the diaphragm and overlying the end of the bore.

5. A hydraulic cylinder according to claim 1 wherein the reservoir is covered by a cap at one end of the body, said cap holding a mounting portion of said diaphragm in sealing engagement with a mounting on the body to inhibit leakage of ambient air into the fluid chamber of the reservoir.

6. A hydraulic cylinder according to claim 1 characterised in that the reservoir is provided around one end of said bore and an operating rod for the piston extends out of the opposite end of said bore.

7. A hydraulic cylinder according to claim 6 characterised in that the piston is hollow and the operating rod extends through the interior of the piston.

8. A hydraulic cylinder according to claim 7 characterised in that the hollow interior of the piston is sealed from said reservoir by means of a closure element.

9. A hydraulic cylinder according to claim 8 characterised in that the operating rod is retained in the piston by the closure element and a surface on the piston.

* * * * *